United States Patent [19]

Shimizu

[11] Patent Number: 5,423,391
[45] Date of Patent: Jun. 13, 1995

[54] STEERING APPARATUS WITH VARIABLE STEERING ANGLE RATIO

[75] Inventor: Yasuo Shimizu, Tochigi, Japan

[73] Assignee: Honda Giken Kogyo Kabushiki Kaisha, Tokyo, Japan

[21] Appl. No.: 102,238

[22] Filed: Aug. 5, 1993

[30] Foreign Application Priority Data

Aug. 5, 1992 [JP] Japan .................................. 4-229343

[51] Int. Cl.$^6$ .............................................. B62D 65/00
[52] U.S. Cl. ................................ 180/79.1; 364/424.05
[58] Field of Search ................... 180/79.1; 364/424.05

[56] References Cited

U.S. PATENT DOCUMENTS 4,751,976 6/1988 Higuchi et al. ..................... 180/79.1
5,141,069 8/1992 Yasui .................................. 180/79.1

FOREIGN PATENT DOCUMENTS 62-18366 1/1987 Japan .
4-243667 8/1992 Japan .

*Primary Examiner*—Mitchell J. Hill
*Attorney, Agent, or Firm*—Hattori, McLeland & Naughton Armstrong, Westerman

[57] ABSTRACT

A steering apparatus for steering a motor vehicle includes a target yaw angular velocity decider which outputs a target yaw angular velocity corresponding to a turned angle of a steering wheel. A controller produces a steering angle ratio command signal based on the difference between the actual yaw angular velocity of the motor vehicle and the target yaw angular velocity, and controls a steering angle ratio varying mechanism to vary a steering angle ratio in order to equalize the actual yaw angular velocity substantially with the target yaw angular velocity.

6 Claims, 7 Drawing Sheets

STEERING APPARATUS WITH VARIABLE STEERING ANGLE RATIO

BACKGROUND OF THE INVENTION

1. Field of the Invention

The present invention relates to a steering apparatus for varying a steering angle ratio, i.e., a transmission ratio, between an angle through which the steering wheel of a motor vehicle is turned and an angle through which steerable road wheels are steered, based on the yaw angular velocity of the motor vehicle.

2. Description of the Prior Art

Japanese laid-open patent publication No. 62-18366 discloses an automobile steering apparatus having, in a steering force transmitting path for transmitting steering forces from a steering wheel to steerable road wheels, a transmission ratio varying means for varying a transmission ratio, i.e., a ratio of a steered angle of the steerable road wheels to a turned angle of the steering wheel. The transmission ratio is varied by the transmission ratio varying means depending on the speed at which the steering wheel is turned, the speed of the automobile, and the turned angle of the steering wheel.

For improved maneuverability of an automobile when the automobile makes a turn, it is necessary to take into account the following considerations:

FIG. 8 of the accompanying drawings shows the relationship between the steering wheel angle and the lateral acceleration of a motor vehicle while the motor vehicle is making a circular turn having a constant radius. The solid-line characteristic curve represents an understeer response (US) which requires a steering wheel angle to be increased when the lateral acceleration of the motor vehicle is increased as a result of an increased vehicle speed. The dotted-line characteristic curve represents an oversteer response (OS) which requires a steering wheel angle to be reduced when the lateral acceleration of the motor vehicle is increased as a result of an increased vehicle speed. Therefore, insofar as the motor vehicle has an understeer response or an oversteer response, the steering wheel angle should be corrected to an extent depending on the lateral acceleration though the motor vehicle is making a constant circular turn. It is desirable that the steering wheel angle remain substantially constant as indicated by the dot-and-dash-line curve which represents an ideal response.

SUMMARY OF THE INVENTION

It is therefore an object of the present invention to provide a steering apparatus for varying a steering angle ratio depending on the yaw angular velocity of a motor vehicle to minimize any increase or reduction in a steering wheel angle while the motor vehicle is making a turn, for thereby improving motor vehicle maneuverability during the turn.

According to the present invention, there is provided a steering apparatus for steering a motor vehicle, comprising a steering wheel, a steerable road wheel, a steering angle ratio varying mechanism for varying a steering angle ratio between a first angle through which the steering wheel is turned and a second angle through which the steerable road wheel is steered, a steering wheel angle detector for detecting the first angle, a yaw angular velocity detector for detecting an actual yaw angular velocity of the motor vehicle, a target yaw angular velocity decider for producing a target yaw angular velocity based on the first angle detected by the steering wheel angle detector, and a steering angle ratio controller for controlling the steering angle ratio varying mechanism to vary the steering angle ratio in order to equalize the actual yaw angular velocity detected by the yaw angular velocity detector substantially with the target yaw angular velocity produced by the target yaw angular velocity decider.

According to the present invention, there is also provided a steering apparatus for steering a motor vehicle, comprising a steering wheel, an input shaft coupled to the steering wheel, a steerable road wheel, an output shaft coupled to the steerable road wheel, a steering angle ratio varying mechanism coupled between the input and output shafts for varying a steering angle ratio between a first angle through which the input shaft is turned and a second angle through which the output shaft is steered, a steering wheel angle detector for detecting the first angle, an output shaft angle detector for detecting the second angle, a yaw angular velocity detector for detecting an actual yaw angular velocity of the motor vehicle, a target yaw angular velocity decider for producing a target yaw angular velocity based on the first angle detected by the steering wheel angle detector, and a steering angle ratio controller for controlling the steering angle ratio varying mechanism to vary the steering angle ratio in order to equalize the actual yaw angular velocity detected by the yaw angular velocity detector substantially with the target yaw angular velocity produced by the target yaw angular velocity decider.

According to the present invention, there is also provided a steering apparatus for steering a motor vehicle, comprising a steering wheel, an input shaft coupled to the steering wheel, a steerable road wheel, a steering angle ratio varying mechanism coupled between the input shaft and the steerable road wheel for varying a steering angle ratio between a first angle through which the input shaft is turned and a second angle through which the steerable road wheel is steered, a steering wheel angle detector for detecting the first angle, a gear ratio sensor for detecting the steering angle ratio controlled by the steering angle ratio varying mechanism, a yaw angular velocity detector for detecting an actual yaw angular velocity of the motor vehicle, a target yaw angular velocity decider for producing a target yaw angular velocity based on the first angle detected by the steering wheel angle detector, and a steering angle ratio controller for controlling the steering angle ratio varying mechanism to vary the steering angle ratio detected by the gear ratio sensor in order to equalize the actual yaw angular velocity detected by the yaw angular velocity detector substantially with the target yaw angular velocity produced by the target yaw angular velocity decider.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
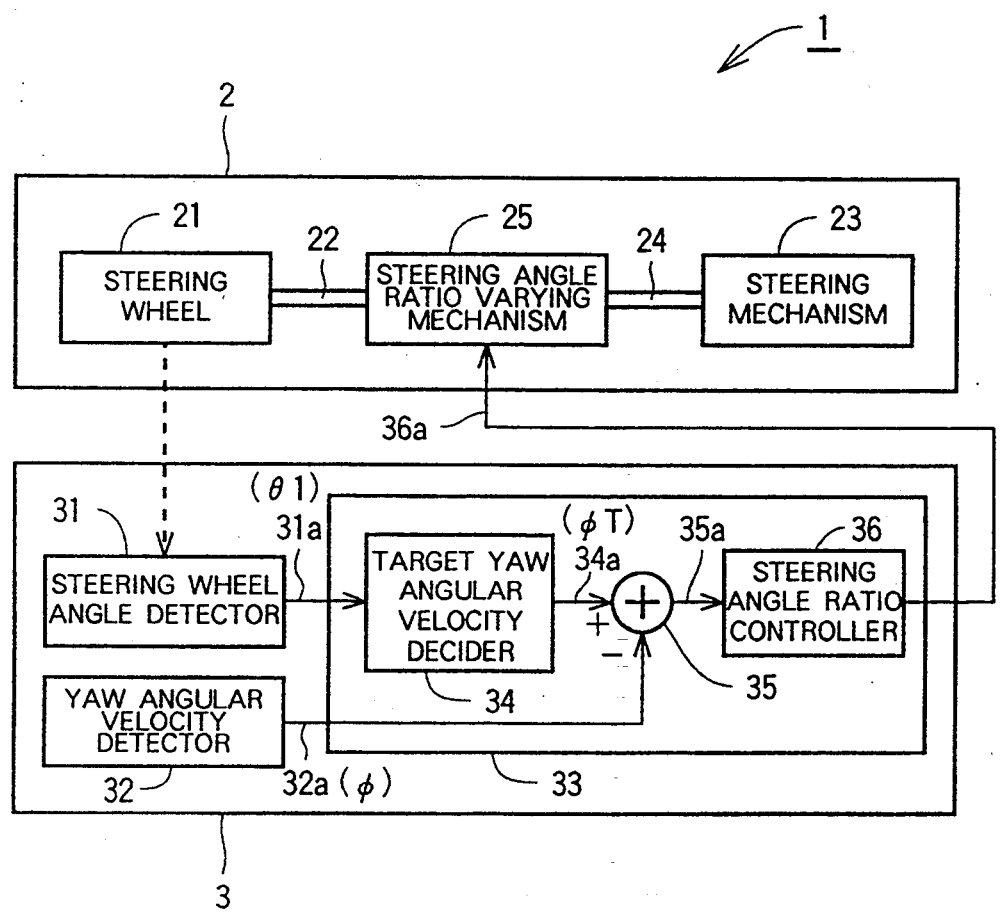
FIG. 1 is a block diagram of a steering apparatus with a variable steering angle ratio according to the present invention.

As shown in FIG. 1, a steering apparatus 1 with a variable steering angle ratio according to the present invention is mounted on a motor vehicle and generally comprises a steering system 2 and a control system 3.

The steering system 2 has a steering wheel 21 of the motor vehicle, an input shaft 22 coupled to the steering wheel 21, a steering mechanism 23 for steering steerable road wheels of the motor vehicle, an output shaft 24 coupled to the steering mechanism 23, and a steering angle ratio (transmission ratio) varying mechanism 25 coupled between the input and output shafts 22, 24.

The control system 3 has a steering wheel angle detector 31 for detecting a turned angle of the steering wheel 21, i.e., an angle through which the steering wheel 21 is turned, a yaw angular velocity detector 32 for detecting a yaw angular velocity of the motor vehicle, and a control device 33 for outputting a steering angle ratio command signal based on detected signals from the steering wheel angle detector 31 and the yaw angular velocity detector 32.

The control device 33 comprises a target yaw angular velocity decider 34, an error calculator 35, and a steering angle ratio controller 36.

The target yaw angular velocity decider 34 generates a signal 34a representing a target yaw angular velocity $\phi T$ based on a detected signal 31a representing a turned angle $\theta 1$ from the steering wheel angle detector 31. The target yaw angular velocity decider 34 comprises a conversion table storing preset target yaw angular velocity data corresponding to turned angles of the steering wheel 21, or a calculating unit for calculating a target yaw angular velocity corresponding to a turned angle of the steering wheel 21 based on a registered function.

The error calculator 35 produces a signal 35a indicative of the difference, or error, between the signal 34a representing a target yaw angular velocity $\phi T$ and a signal 32a representing an actual yaw angular velocity $\phi$ detected by the yaw angular velocity detector 32.

The steering angle ratio controller 36 generates a steering angle ratio command signal 36a based on the signal 35a from the error calculator 35, and supplies the steering angle ratio command signal 36a to the steering angle ratio varying mechanism 25.

Operation of the steering apparatus 1 shown in FIG. 1 will be described below.

Based on the turned angle $\theta 1$ of the steering wheel 21 which is detected by the steering wheel angle detector 31, the target yaw angular velocity decider 34 generates and outputs a target yaw angular velocity $\phi T$ that is desirable for the motor vehicle to have with the turned angle $\theta 1$. The error calculator 35 outputs the difference between the actual yaw angular velocity $\phi$ detected by the yaw angular velocity detector 32 and the target yaw angular velocity $\phi T$. Based on the magnitude and polarity of the difference or error, the steering angle ratio controller 36 varies the steering angle ratio (transmission ratio) of the steering angle ratio varying mechanism 25.

When the steering angle ratio is varied, the steered angle of the motor vehicle is varied even if the turned angle of the steering wheel 21 remains the same. Therefore, the yaw angular velocity of the motor vehicle is varied, and so is the detected signal 32a from the yaw angular velocity detector 32. The control system 3 controls the steering angle ratio varying mechanism 25 through a feedback loop so that the difference between the actual yaw angular velocity $\phi$ and the target yaw angular velocity $\phi T$ will be eliminated.

For example, while the motor vehicle is making a circular turn having a constant radius, the lateral acceleration of the motor vehicle increases if the speed of the vehicle is increased with the turned angle of the steering wheel 21 being constant. If the motor vehicle is a front-engine front-drive motor vehicle, then when the propulsive torque of the motor vehicle is increased, since the cornering force is reduced and the center of gravity of the motor vehicle is positioned in a front portion of the motor vehicle, the motor vehicle tends to have an understeer response as indicated by the solid-line characteristic curve in FIG. 8. As the yaw angular velocity $\phi$ of the motor vehicle is reduced, the out-put signal 35a from the error calculator 35 is increased. The steering angle ratio controller 36 now increases the steering angle ratio of the steering angle ratio varying mechanism 25. Therefore, even though the turned angle of the steering wheel 21 remains constant, the steered angle of the steerable road wheels is increased, and the steering response of the motor vehicle approaches the ideal response as indicated by the dot-and-dash-line characteristic curve in FIG. 8.

Figure 8:
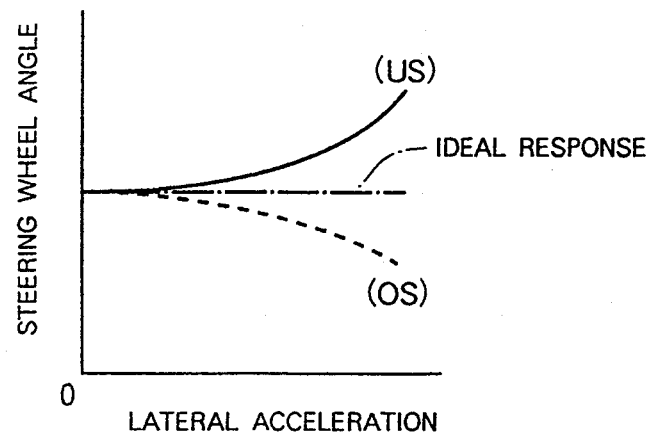
FIG. 8 is a graph showing the relationship between the steering wheel angle and the lateral acceleration of a motor vehicle while the motor vehicle is making a circular turn having a constant radius.

If the motor vehicle is a front-engine rear-drive motor vehicle, then the motor vehicle tends to have an oversteer response as indicated by the dotted-line characteristic curve in FIG. 8, because of greater slippage of the rear road wheels. As the yaw angular velocity $\phi$ of the motor vehicle is increased, the output signal 35a from the error calculator 35 is reduced. Therefore, the steering angle ratio controller 36 reduces the steering angle ratio of the steering angle ratio varying mechanism 25. The steered angle of the steerable road wheels is reduced, and the steering response of the motor vehicle approaches the ideal response as indicated by the dot-and-dash-line characteristic curve in FIG. 8.

The above steering angle ratio control is also effected when the yaw angular velocity of the motor vehicle changes due to a different coefficient of friction of the road irrespective of whether the motor vehicle is a front-engine front-drive motor vehicle or a front-engine rear-drive motor vehicle.

Specific details of the steering apparatus 1 will be described below with reference to FIGS. 2 through 4.

Figure 2:
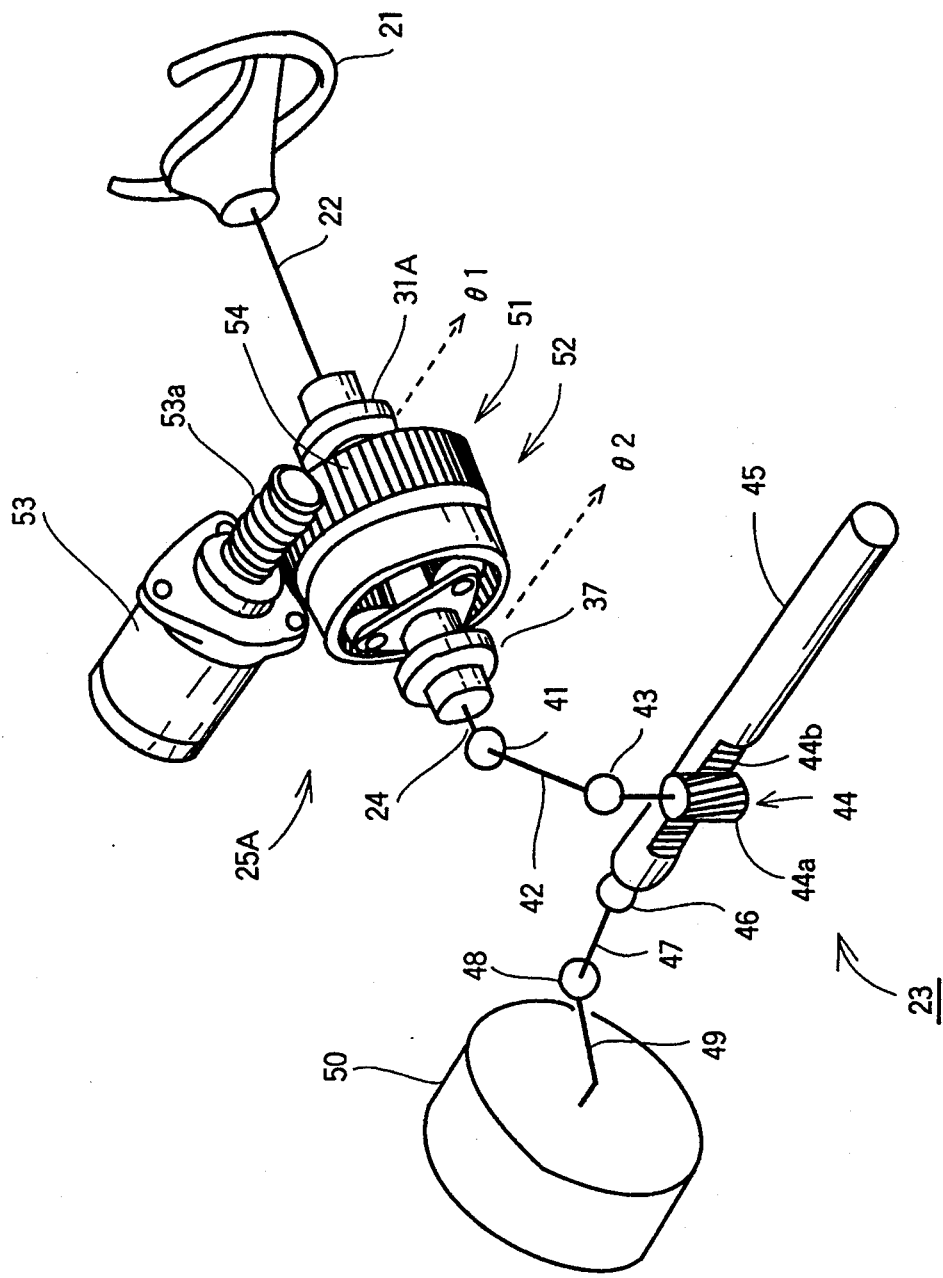
FIG. 2 is a perspective view of a steering system of the steering apparatus.

FIG. 2 shows the steering wheel 21, the input shaft 22, the steering mechanism 23, the output shaft 24, and a steering angle ratio (transmission ratio) varying mechanism 25A with a variable gear ratio.

Steering forces from the steering wheel 21 are applied through the input shaft 22 to the steering angle ratio varying mechanism 25A. The input shaft 22 is combined with a steering wheel angle detector 31A for detecting the angle through which the input shaft 22 rotates, i.e., the turned angle $\theta 1$ of the steering wheel 21. The output shaft 24 is combined with an output shaft angle detector 37 for detecting an angle $\theta 2$ through which the output shaft 24 rotates.

The steering wheel angle detector 31A and the output shaft angle detector 37 comprise respective rotary encoders or rotational angle detectors for generating a pulse signal upon angular movement through a predetermined angle. Output signals from the steering wheel angle detector 31A and the output shaft angle detector 37 are processed by respective signal processors, described later, in a control device (see FIG. 4) to produce the signals representing the turned angle $\theta 1$ of the steering wheel 21 and the rotational angle $2\theta$ of the output shaft 24. Therefore, the steering wheel angle detector 31A and the corresponding signal processor jointly serve as the steering wheel angle detector 31 shown in FIG. 1.

In FIG. 2, the output forces from the output shaft 24 are transmitted through a universal joint 41, an intermediate shaft 42, and a universal joint 43 to a rack-and-pinion mechanism 44. The rack-and-pinion mechanism 44 comprises a pinion gear 44a coupled to the universal joint 43 and a rack shaft 45 having rack teeth 44b meshing with the pinion gear 44a. The rack-and-pinion mechanism 44 converts rotation of the universal joint 43 into axial movement of the rack shaft 45. The axial movement of the rack shaft 45 is transmitted through a spherical joint 46, a tie rod 47, a spherical joint 48, and a knuckle 49 to a steerable road wheel 50, which is then steered to change the direction of the motor vehicle.

The steering angle ratio varying mechanism 25A comprises a first planetary gear mechanism 51 coupled to the input shaft 22, a second planetary gear mechanism 52 coupled to the output shaft 24, and a motor 53 for imparting motion to change the gear ratio of the steering angle ratio varying mechanism 25A. The second planetary gear mechanism 52 receives carrier rotation from the first planetary gear mechanism 51.

Figure 3:
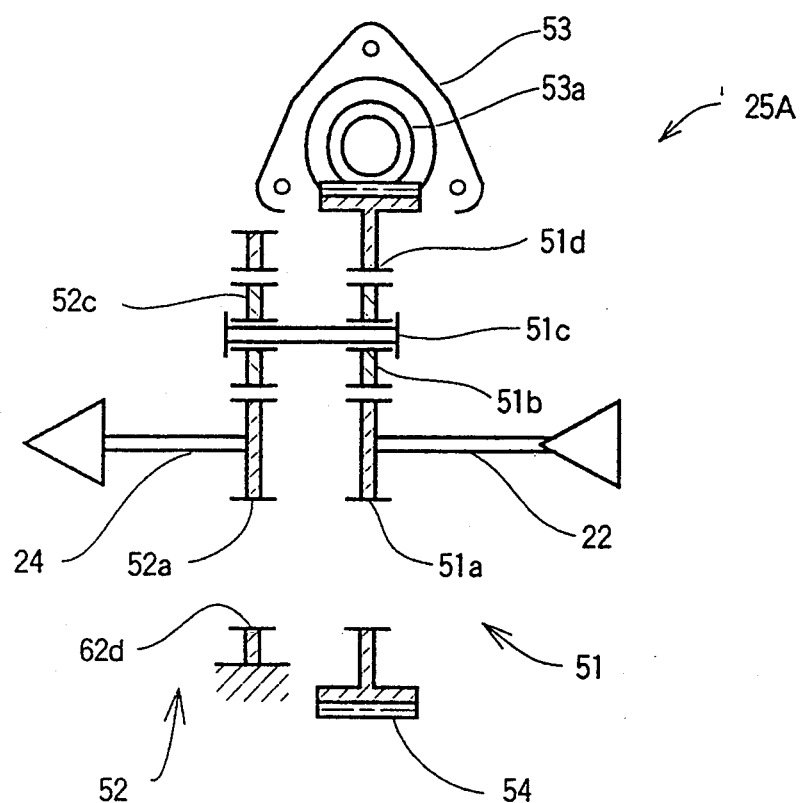
FIG. 3 is a schematic cross-sectional view of a steering angle ratio (transmission ratio) varying mechanism with a variable gear ratio.

More specifically, as shown in FIG. 3, the first planetary gear mechanism 51 comprises a first sun gear 51a connected to the input shaft 22, a plurality of first planet pinion gears 51b disposed around the first sun gear 51a in mesh therewith, a carrier 51c on which the first planet pinion gears 51b are rotatably supported, a first ring gear 51d disposed around the first planet pinion gears 51b in mesh therewith and having a worm wheel 54 on its outer circumferential surface. The second planetary gear mechanism 52 comprises a second sun gear 52a connected to the output shaft 24, a plurality of second planet pinion gears 52c disposed around the second sun gear 52a in mesh therewith and rotatably supported on the carrier 51c, and a second ring gear 62d disposed around the second planet pinion gears 52b in mesh therewith and fixed against rotation.

The first planetary gear mechanism 51 and the second planetary gear mechanism 52 have the same speed reduction ratio.

The motor 53 has an output shaft with a worm gear 53a integrally mounted thereon and held in mesh with the worm wheel 54 of the first planetary gear mechanism 51.

When the motor 53 is de-energized, the steering forces from the steering wheel 21 are transmitted through the input shaft 22, the first sun gear 51a, the first pinion gears 51b, the carrier 51c, the second pinion gears 52c, and the second sun gear 52a to the output shaft 24. Since the first planetary gear mechanism 51 and the second planetary gear mechanism 52 have the same speed reduction ratio, the rotational angle $\theta 1$ of the input shaft 22 is equal to the rotational angle $\theta 2$ of the output shaft 24.

When the motor 53 is energized to rotate the worm wheel 54 and hence the first ring gear 51d in the same direction as, and faster than, the input shaft 22, the carrier 51c is rotated faster in the same direction. As a result, the second sun gear 52a is caused by the second pinion gears 52c to rotate in the same direction as, and faster than, the first sun gear 51a. Consequently, the rotational angle $\theta 2$ of the output shaft 24 is greater than the rotational angle $\theta 1$ of the input shaft 22 in the same direction. Thus, the gear ratio of the steering angle ratio varying mechanism 25A is increased. Conversely, when the motor 53 is energized to rotate the worm wheel 54 in the opposite direction to, and faster than, the input shaft 22, the carrier 51c is rotated slower in the same direction. As a result, the second sun gear 52a is caused by the second pinion gears 52c to rotate in the same direction as, and slower than, the first sun gear 51a. Consequently, the rotational angle $\theta 2$ of the output shaft 24 is smaller than the rotational angle $\theta 1$ of the input shaft 22 in the same direction. Thus, the gear ratio of the steering angle ratio varying mechanism 25A is reduced.

Figure 4:
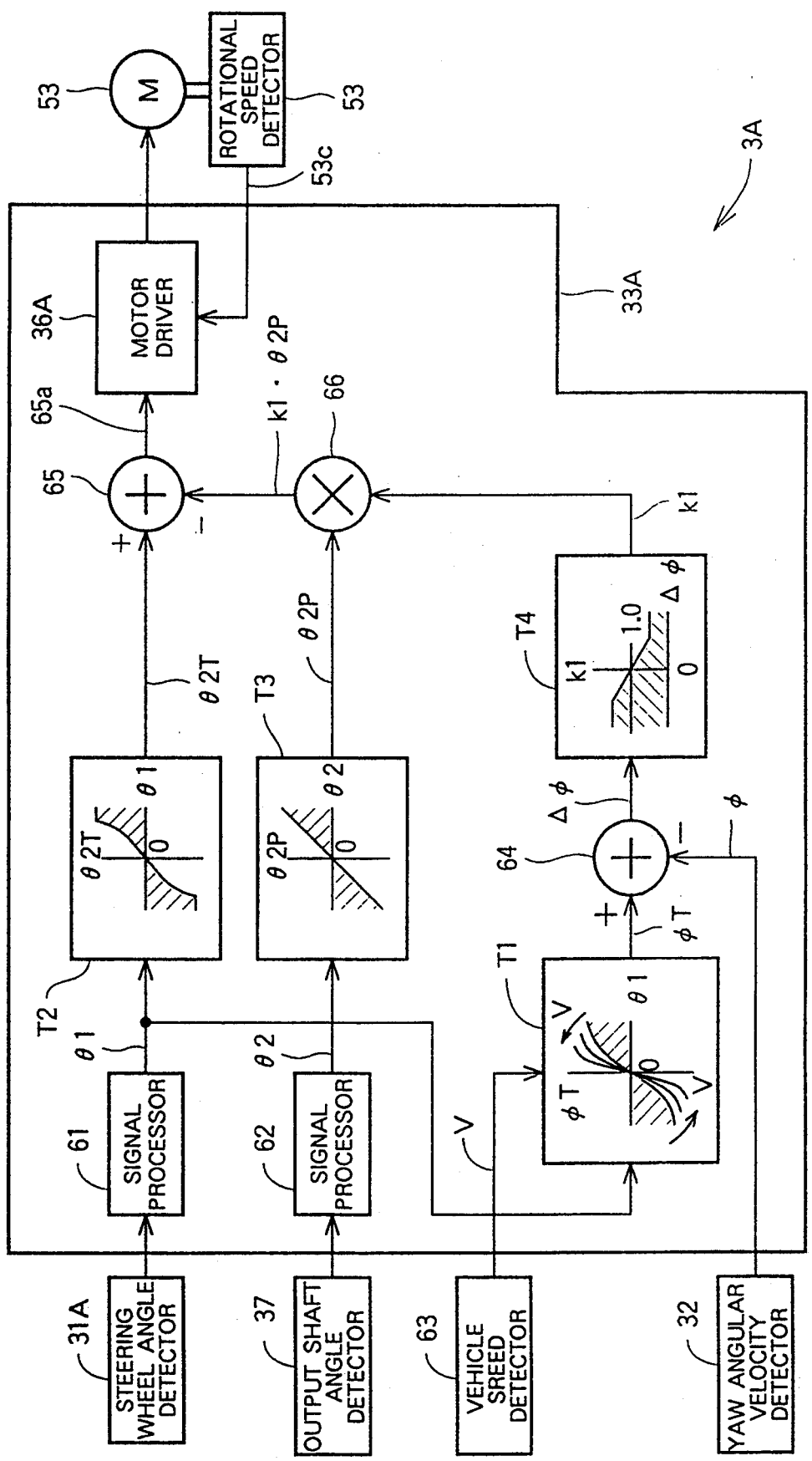
FIG. 4 is a block diagram of a control system.

A control system 3A, which corresponds to the control system 3 shown in FIG. 1, is shown in block form in FIG. 4. The control system 3A has a control device 33A, which corresponds to the control device 33 shown in FIG. 1, including a signal processor 61 for generating a signal $\theta 1$ indicative of the turned angle of the steering wheel 21 based on the detected signal from the steering wheel angle detector 31A, and a signal processor 62 for generating a signal $\theta 2$ indicative of the rotational angle of the output shaft 24 based on the detected signal from the output shaft angle detector 37.

The control system 3A also has a vehicle speed detector 63 for detecting the speed of the motor vehicle as well as the yaw angular velocity detector 32.

The control device 33A further includes first, second, third, and fourth tables T1~T4, first and second adders 64, 65, a multiplier 66, and a motor driver 36A corresponding to the steering angle ratio controller 36 shown in FIG. 1.

The first table T1, which serves as the target yaw angular velocity decider 34 shown in FIG. 1, stores predetermined target yaw angular velocity data $\phi T$ in relation to turned angles $\theta 1$ of the steering wheel 21 and vehicle speeds V.

The second table T2 stores predetermined target rotational angle data $\theta 2T$ for the output shaft 24 in relation to turned angles $\theta 1$ of the steering wheel 21. A target rotational angle $\theta 2T$ for the output shaft 24 corresponding to a certain turned angle $\theta 1$ of the steering wheel 21 is obtained from the second table T2.

The third table T3 stores predetermined data $\theta 2P$ in relation to output shaft rotational angles $\theta 2$. The third table T3 produces data $\theta 2P$ proportional to a certain output shaft rotational angle $\theta 2$. The third table T3 may be replaced with a calculating unit for calculating data $\theta 2P$ proportional to a certain output shaft rotational angle $\theta 2$.

The first adder 64 serves as the error calculator 35 shown in FIG. 1. The first adder 64 outputs the difference $\Delta\phi$ ($\Delta\phi = \phi T - \phi$) between a target yaw angular velocity $\phi T$ from the first table T1 and an actual yaw angular velocity $\phi$. The difference or error $\Delta\phi$ is supplied to the fourth table T4.

The fourth table T4 stores correcting coefficients k1 for correcting the output data $\theta 2P$ from the third table T3 based on the magnitude of the difference or error $\Delta\phi$ and its polarity.

The multiplier 66 produces the product k1·$\theta 2P$ of the output data $\theta 2P$ from the third table T3 and a coefficient k1 from the fourth table T4. The product k1·$\theta 2P$ from the multiplier 66 is supplied to an input terminal of the second adder 65.

The target rotational angle $\theta 2T$ for the output shaft 24 is supplied from the second table T2 to the other input terminal of the second adder 65. The second adder 65 determines the difference between the target rotational angle $\theta 2T$ for the output shaft 24 and the product k1·$\theta 2P$ from the multiplier 66, and supplies a difference or error output 65a to the motor driver 36A.

Based on the supplied difference or error output 65a, the motor driver 36A controls an electric current to be supplied to the motor 53 for thereby controlling the rotational speed of the motor 53 to vary the gear ratio of the steering angle ratio varying mechanism 25A.

The motor 53 is associated with a rotational speed detector 53b for detecting the rotational speed of the motor 53 and producing a rotational speed signal 53c indicative of the detected rotational speed. The motor driver 36A controls the motor 53 to keep a certain rotational speed to achieve a desired gear ratio through a feedback loop based on the rotational speed signal 53c from the rotational speed detector 53b.

Alternatively, the current that is actually to the motor 53 may be detected by a current detector, and the motor driver 36A may supply a current to the motor 53 to achieve a desired gear ratio through a feedback loop based on the detected current.

The steering apparatus shown in FIGS. 2 through 4 operates as follows:

Target rotational angle data $\theta 2T$ for the output shaft 24 are of nonlinear characteristics as indicated by the table T2 in FIG. 4, for example, in view of motor vehicle characteristics such as front-engine front-drive motor vehicle characteristics or front-engine rear-drive motor vehicle characteristics, and in order to achieve desired maneuverability characteristics, i.e., a sharper steering response with a high gear ratio when the motor vehicle travels at lower speeds, and a stabler steering response with a low gear ratio when the motor vehicle travels at higher speeds. This is because larger steering angles are employed in a lower vehicle speed range and smaller steering angles are employed in a higher vehicle speed range.

While the motor vehicle is making a circular turn with a constant radius, when the yaw angular velocity of the motor vehicle changes with respect to a target yaw angular velocity due to a change in the vehicle speed V and road wheel slippage, the output data $\theta 2P$ from the third table T3 is corrected, i.e., increased or reduced, based on the coefficient k1 from the table T4.

More specifically, when the propulsive torque of the motor vehicle increases during a circular turn with a constant radius, the motor vehicle is displaced radially outwardly of the turning circle. The target yaw angular velocity $\phi T$ remains unchanged as the turned angle $\theta 1$ of the steering wheel 21 remains the same. However, since the actual yaw angular velocity $\phi$ changes, the error $\Delta\phi$ becomes positive, causing the fourth table T4 to output a coefficient k1 smaller than 1.0.

Accordingly, the product k1·$\theta 2P$ from the multiplier 66 is reduced. The rotational angle $\theta 2$ of the output shaft 24 is increased, resulting in an increase in the steered angle of the steerable road wheels. This prevents the turned angle $\theta 1$ of the steering wheel 21 from being increased. The steering apparatus operates in the same manner when the road wheels skid. Therefore, as with the basic arrangement shown in FIG. 1, the control system 3A determines a target yaw angular velocity $\phi T$ based on the detected signal $\theta 1$, and controls the gear ratio of the steering angle ratio varying mechanism 25A in order to eliminate the difference $\Delta\phi$ between the target yaw angular velocity $\phi T$ and the actual yaw angular velocity $\phi$.

When the vehicle speed increases during a circular turn with a constant radius, the propulsive torque and also the lateral acceleration of the motor vehicle are increased. However, inasmuch as the turned angle $\theta 1$ of the steering wheel 21 remains unchanged, the control system 3A controls the motor 53 using the target yaw angular velocity $\phi T$ that has been varied by an increase in the vehicle speed.

Therefore, the steering apparatus shown in FIGS. 2 through 4 can control the motor vehicle to achieve the ideal characteristic curve indicated by the dot-and-dash line in FIG. 8 as with the basic arrangement shown in FIG. 1.

A steering system according to another embodiment of the present invention will be described below with reference to FIGS. 5, 6A, and 6B. Those parts in FIGS. 5, 6A, and 6B which are identical to those shown in FIG. 2 are denoted by identical reference characters, and will not be described in detail.

Figure 5:
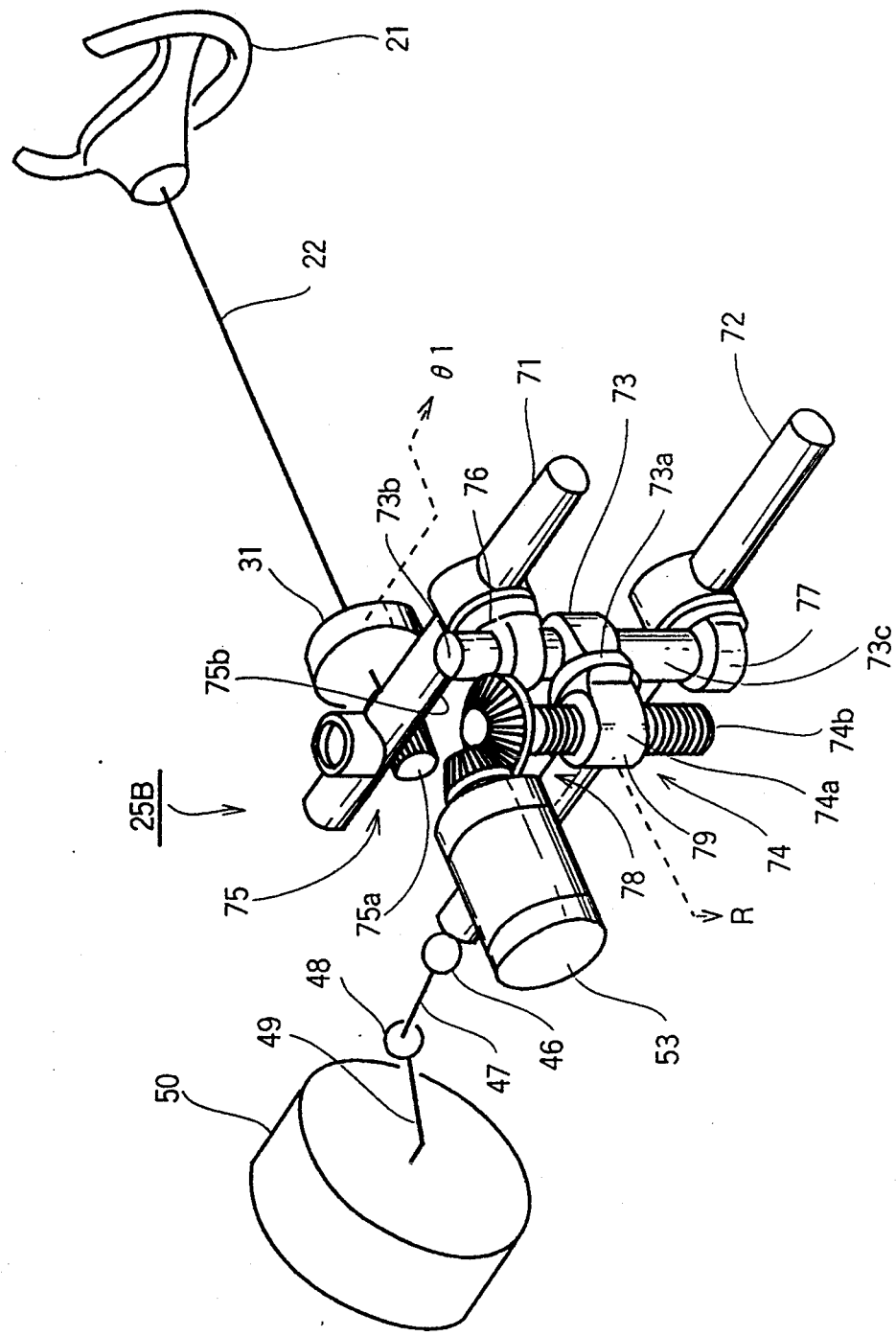
FIG. 5 is a perspective view of a steering system according to another embodiment of the present invention.

As shown in FIG. 5, the control system includes a steering angle ratio (transmission ratio) varying mechanism 25B with a variable gear ratio which comprises a first long shaft 71, a second long shaft 72 spaced downwardly from and extending parallel to the first long shaft 71, a vertical lever 73 interconnecting the first and second long shafts 71, 72 and having a pivot support 73a axially movably mounted thereon, a screw mechanism 74 for moving the pivot support 73a on and along the lever 73, and a motor 53 for rotating the screw mechanism 74.

The input shaft 22 coupled to the steering wheel 21 is combined with the steering wheel angle detector 31 which detects the turned angle $\theta 1$ of the steering wheel 21.

The first long shaft 71 has rack teeth 75b near one end thereof. A rack-and-pinion mechanism 75 has a pinion gear 75a held in mesh with the rack teeth 75b and coupled to the input shaft 22. Steering forces from the steering wheel 21 are transmitted through the input shaft 22 and the pinion gear 75a to the rack teeth 75b, which effect axial movement of the first long shaft 71.

A first support shaft 76 is rotatably mounted on the first long shaft 71 near the other end thereof. The lever 73 has a first cylindrical member 73b slidably fitted in the first support shaft 76 and a second cylindrical member 73c coaxially coupled to the first cylindrical member 73b. The second cylindrical member 73c is slidably fitted in a second support shaft 77 that is rotatably mounted on the second long shaft 72. The pivot support 73a is rotatably supported on a nut 74a of the screw mechanism 74. The screw mechanism 74 has a screw 74b threaded through the nut 74a.

The motor 53 has an output shaft that is operatively coupled to the screw 74b through a bevel gear mechanism 78.

Figure 6:
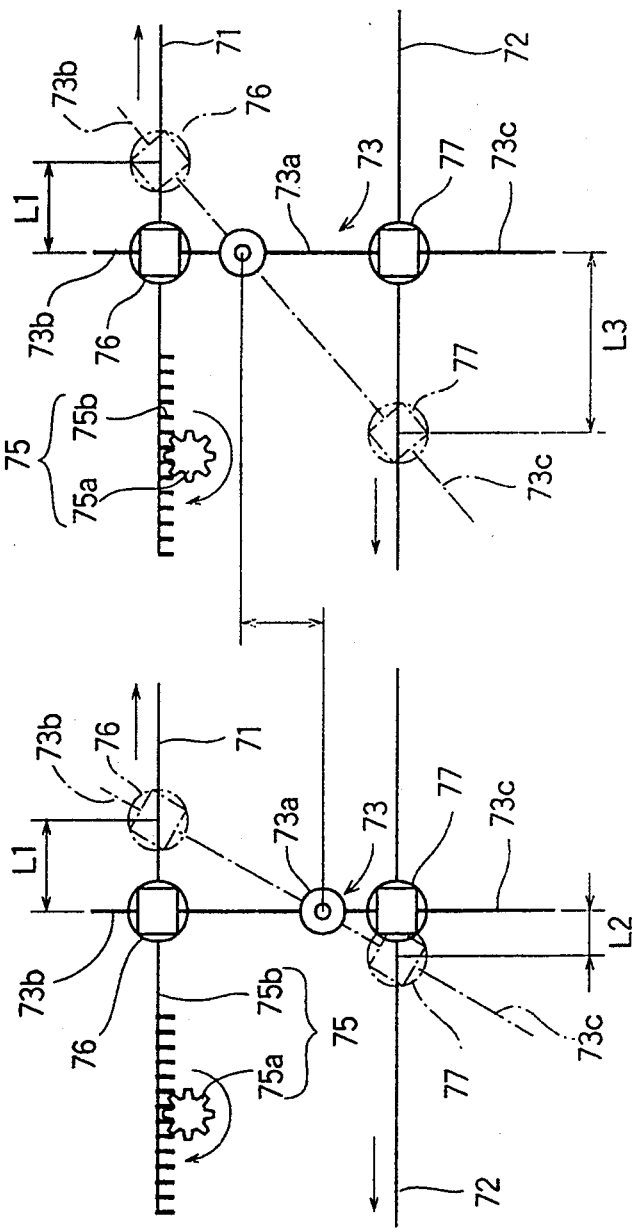
FIGS. 6A and 6B are schematic views showing the manner in which a steering angle ratio (transmission ratio) varying mechanism of the steering system shown in FIG. 5 operates.

FIGS. 6A and 6B illustrate the manner in which the steering angle ratio varying mechanism 25B operates.

Depending on the position of the pivot support 73a, an axial displacement L1 of the first long shaft 71 may be converted into an axial displacement L2 of the second long shaft 72, as shown in FIG. 6A, or may be converted into an axial displacement L3 of the second long shaft 72, as shown in FIG. 6B. The axial displacement of the second long shaft 72 is transmitted through the spherical joint 46, the tie rod 48, the spherical joint 49, and the knuckle 49 to the steerable road wheel 50 for thereby steering the steerable road wheel 50.

The rotation from the motor 53 is transmitted to the screw 74b of the screw mechanism 74 through the gear mechanism 78. The vertical position of the nut 74a, i.e., the pivot support 73a, with respect to the first and second long shafts 71, 72 corresponds to the gear ratio of the steering angle ratio varying mechanism 25B. The nut 74a is associated with a gear ratio sensor 79 which outputs a signal R indicative of the gear ratio of the steering angle ratio varying mechanism 25B.

Figure 7:
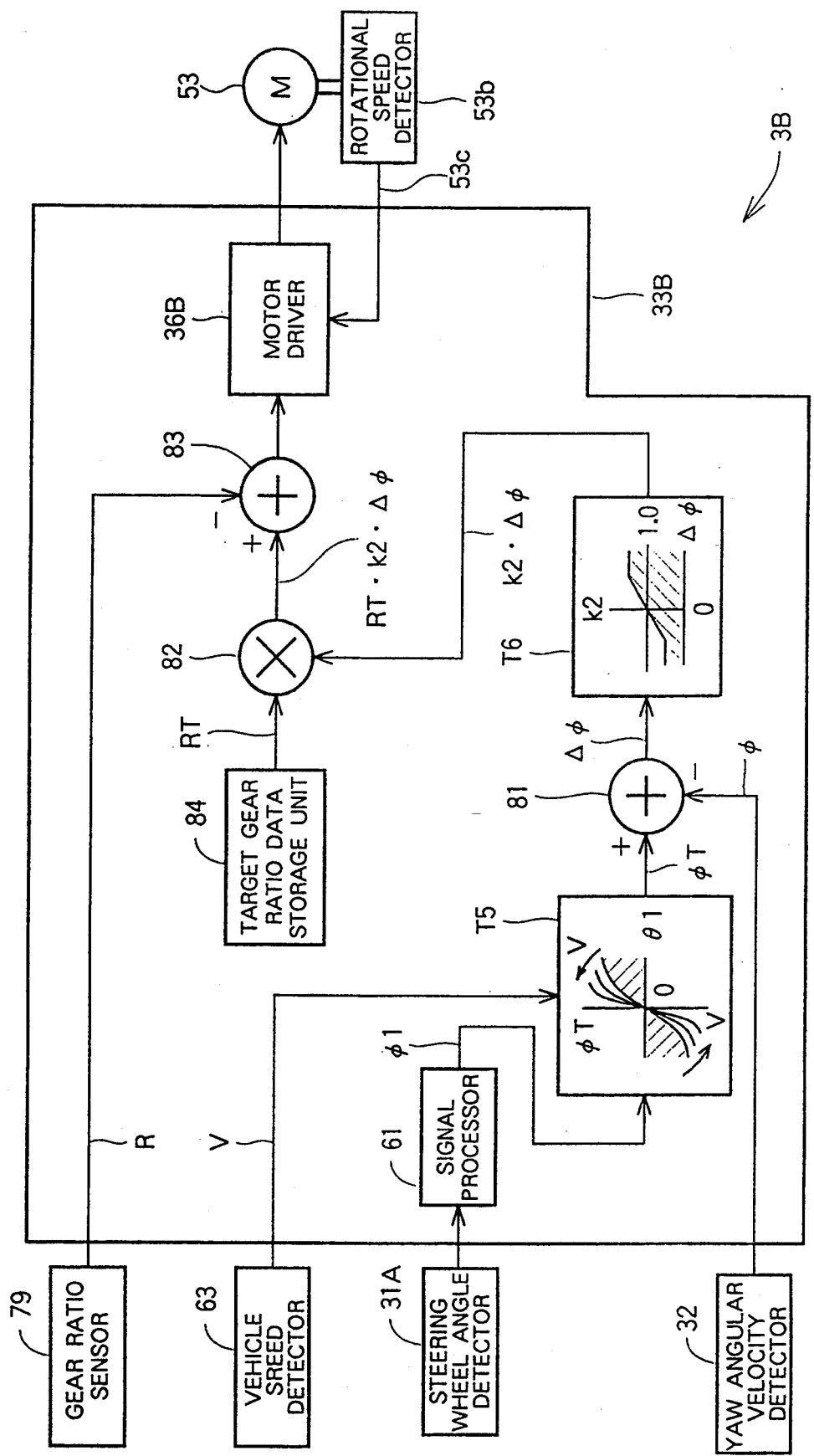
FIG. 7 is a block diagram of a control system according to still another embodiment of the present invention.

FIG. 7 shows in block form a control system 3B according to still another embodiment of the present invention. Those parts in FIG. 7 which are identical to those shown in FIG. 4 are denoted by identical reference characters, and will not be described in detail.

The control system 3B is supplied with detected signals from the steering wheel angle detector 31A, the yaw angular velocity detector 32, and the vehicle speed detector 63. The control system 3B is also supplied with the signal R from the gear ratio sensor 79.

The control system 3B includes a control device 33B which has a fifth table T5 storing predetermined target yaw angular velocity data $\phi T$ in relation to turned angles $\theta 1$ of the steering wheel 21 and vehicle speeds V.

The control device 33B also has a sixth table T6 that stores correcting coefficients k2 in relation to the differences $\Delta\phi$ ($\Delta\phi = \phi T - \phi$) between target yaw angular velocities $\phi T$ and actual yaw angular velocities $\phi$. The coefficients K2 stored in the sixth table T6 are related to the differences $\Delta\phi$ in a manner opposite to the coefficients K1 stored in the fourth table T4 shown in FIG. 4.

The control device 33B includes an adder 81 serving as the error calculator for calculating the difference $\Delta\phi(\Delta\phi = \phi T - \phi)$ between a target yaw angular velocity $\phi T$ supplied from the fifth table T5 and an actual yaw angular velocity $\phi$ supplied from the yaw angular velocity detector 32, and supplies the calculated difference $\Delta\phi$ to the sixth table T6. The sixth table T6 then outputs a signal k2·$\Delta\phi$ indicative of the product of the difference $\Delta\phi$ and a corresponding coefficient k2.

In the control device 33B, a target gear ratio data storage unit 84 stores predetermined target gear ratio data RT in relation to steering angles. The target gear ratio data storage unit 84 supplies a selected target gear ratio RT to a multiplier 82.

The multiplier 82 produces a signal RT·k2·$\Delta\phi$ indicative of the product of the target gear ratio RT from the target gear ratio data storage unit 84 and the signal k2·$\Delta\phi$ from the sixth table T6, and supplies the signal RT·k2·$\Delta\phi$ to an adder 83 which generates the difference between the signal RT·k2·$\Delta\phi$ and the detected signal R from the gear ratio sensor 79. The difference signal from the adder 83 is supplied to a motor driver 36B to energize the motor 53. Therefore, the control system 3B controls the motor 53 through a feedback loop in order to eliminate the difference between the signal RT·k2·$\Delta\phi$ and the gear ratio signal R.

Therefore, the steering apparatus with the control system 3B shown in FIG. 7 can control the motor vehicle to achieve the ideal characteristic curve indicated by the dot-and-dash line in FIG. 8 as with the basic arrangement shown in FIG. 1.

Each of the control devices 33A, 33B may be supplied with a signal indicative of the lateral acceleration of the motor vehicle or a signal indicative of the current flowing through the motor 53, rather than the signal indicative of the vehicle speed.

The steering apparatus may be equipped with a function to effect a failure diagnosis or a function to reconfigure or recover itself from a failure.

As described above, the steering apparatus according to the present invention can automatically adjust or control the steering gear ratio (transmission ratio) so as to achieve a target yaw angular velocity. Therefore, the steered angle of the steerable road wheels is automatically adjusted to an angle to achieve a target yaw angular velocity even though the driver of the motor vehicle does not adjust the turned angle of the steering wheel. For example, when the motor vehicle is accelerated or decelerated while the motor vehicle is making a circular turn with a constant radius, the steered angle of the steerable road wheels is automatically adjusted such that the motor vehicle will have a target yaw angular velocity that is determined based on the turned angle of the steering wheel.

Since the driver is not required to increase or reduce the turned angle of the steering wheel upon acceleration or deceleration of the motor vehicle or changes in the road condition, the maneuverability of the motor vehicle is improved.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A steering apparatus for steering a motor vehicle, comprising:
   a steering wheel;
   a steerable road wheel operatively connected to said steering wheel;
   a steering angle ratio varying mechanism for varying a steering angle ratio between a first angle through which said steering wheel is turned and a second angle through which said steerable road wheel is steered;
   a steering wheel angle detector for detecting said first angle;
   a yaw angular velocity detector for detecting an actual yaw angular velocity of the motor vehicle;
   a target yaw angular velocity decider for producing a target yaw angular velocity based on the first angle detected by said steering wheel angle detector;

a steering angle ratio controller for controlling said steering angle ratio varying mechanism to vary said steering angle ratio in order to equalize the actual yaw angular velocity detected by said yaw angular velocity detector substantially with the target yaw angular velocity produced by said target yaw angular velocity decider;

wherein said steering angle ratio varying mechanism comprises:

an output shaft coupled to said steering wheel;

an axially movable first shaft operatively coupled to said input shaft;

an axially movable second shaft operatively coupled to said steerable road wheel, said second shaft extending parallel to said first shaft and spaced from said first shaft;

a lever, said lever having opposite end portions which are rotatably connected to said first and second shafts, respectively;

a pivot support axially movably supported on said lever;

a screw mechanism connected to said pivot support; and an actuator for rotating said screw mechanism to axially move said pivot support on said lever.

2. A steering apparatus for steering a motor vehicle, comprising:

a steering wheel;

an input shaft coupled to said steering wheel;

a steerable road wheel;

a steering angle ratio varying mechanism coupled between said input shaft and said steerable road wheel for varying a steering angle ratio between a first angle through which said input shaft is turned and a second angle through which said steerable road wheel is steered;

a steering wheel angle detector for detecting said first angle;

a gear ratio sensor for detecting the steering angle ratio controlled by said steering angle ratio varying mechanism;

a yaw angular velocity detector for detecting an actual yaw angular velocity of the motor vehicle;

a target yaw angular velocity decider for producing a target yaw angular velocity based on the first angle detected by said steering wheel angle detector; and a steering angle ratio controller for controlling said steering angle ratio varying mechanism to vary said steering angle ratio detected by said gear ratio sensor in order to equalize the actual yaw angular velocity detected by said yaw angular velocity detector substantially with the target yaw angular velocity produced by said target yaw angular velocity decider.

3. A steering apparatus according to claim 2, wherein said steering angle ratio varying mechanism comprises:

an input shaft coupled to said steering wheel;

an output shaft coupled to said steerable road wheel;

a first planetary gear mechanism coupled to said input shaft;

a second planetary gear mechanism coupled to said output shaft;

said first and second planetary gear mechanisms being operatively coupled to each other; and an actuator for rotating said first planetary gear mechanism.

4. A steering apparatus according to claim 3, wherein said first planetary gear mechanism comprises a first sun gear coupled to said input shaft, a plurality of first planet pinion gears held in mesh with said first sun gear, a carrier on which said first planet pinion gears are rotatably supported, and a first ring gear held in mesh with said first planet pinion gears and having a worm wheel, and wherein said second planetary gear mechanism comprises a second sun gear coupled to said output shaft, a plurality of second planet pinion gears held in mesh with said second sun gear and rotatably supported on said carrier, and a second ring gear held in mesh with said second planet pinion gears and fixed against rotation, said actuator having a worm gear held in mesh with said worm wheel.

5. A steering apparatus according to claim 2, further comprising a vehicle speed detector for detecting a speed of the motor vehicle, said target yaw angular velocity decider comprising means for producing a target yaw angular velocity based on the second angle detected by said steering wheel angle detector and the speed of the motor vehicle detected by said vehicle speed detector.

6. A steering apparatus according to claim 2, further including an error calculator for producing the difference between the target yaw angular velocity and the actual yaw angular velocity, said steering angle ratio controller comprising means for controlling said steering angle ratio varying mechanism to vary said steering angle ratio in order to eliminate said difference.

* * * * *